(12) United States Patent
Kazmar et al.

(10) Patent No.: US 7,689,689 B2
(45) Date of Patent: Mar. 30, 2010

(54) PROTECTION OF INDUSTRIAL EQUIPMENT FROM NETWORK STORMS EMANATING FROM A NETWORK SYSTEM

(75) Inventors: Kris Alan Kazmar, Harleysville, PA (US); Anthony John Smith, New Tripoli, PA (US); Richard Crawford Riddle, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 314 days.

(21) Appl. No.: 11/760,967

(22) Filed: Jun. 11, 2007

(65) Prior Publication Data

US 2008/0307087 A1   Dec. 11, 2008

(51) Int. Cl.
*G06F 15/16* (2006.01)
(52) U.S. Cl. ..................................... 709/224
(58) Field of Classification Search .................. 709/224
See application file for complete search history.

(56) References Cited

U.S. PATENT DOCUMENTS

| | | | | |
|---|---|---|---|---|
| 5,341,363 | A * | 8/1994 | Hirasawa | 370/221 |
| 6,374,286 | B1 * | 4/2002 | Gee et al. | 718/108 |
| 6,457,135 | B1 * | 9/2002 | Cooper | 713/323 |
| 6,789,203 | B1 * | 9/2004 | Belissent | 726/22 |
| 2002/0073338 | A1 | 6/2002 | Burrows et al. | |
| 2003/0144894 | A1 * | 7/2003 | Robertson et al. | 705/8 |
| 2003/0233463 | A1 | 12/2003 | O'Connor | |
| 2004/0044771 | A1 * | 3/2004 | Allred et al. | 709/227 |
| 2004/0062200 | A1 * | 4/2004 | Kesavan | 370/235 |
| 2005/0100020 | A1 * | 5/2005 | Hata et al. | 370/395.21 |
| 2005/0220013 | A1 | 10/2005 | Singh et al. | |
| 2005/0232153 | A1 | 10/2005 | Bishop et al. | |
| 2005/0246465 | A1 * | 11/2005 | Wright et al. | 710/260 |
| 2005/0246466 | A1 * | 11/2005 | Wright et al. | 710/260 |
| 2006/0002407 | A1 | 1/2006 | Sakamoto | |
| 2006/0225133 | A1 * | 10/2006 | Balasubramaniyan et al. | 726/22 |

FOREIGN PATENT DOCUMENTS

WO        2004021669 A1    3/2004

* cited by examiner

*Primary Examiner*—William C Vaughn, Jr.
*Assistant Examiner*—Boris Gorney
(74) *Attorney, Agent, or Firm*—Lina Yang

(57) ABSTRACT

A method of protecting a networked industrial controller from network storms is disclosed in the specification. The networked industrial controller has a real-time operating system and communication components performing communication exchanges with connected networks. The method comprises steps of:
(a) Initializing a watchdog thread monitor thread to have a high priority within the real-time operating system's kernel level;
(b) configuring a watchdog thread to periodically (every $T_{Alive}$ time) send an alive event signal to the watchdog thread monitor thread if all other threads of application programs are operating normally;
(c) starting the watchdog thread monitor thread waiting for receiving the alive event signal within a timeout period $T_{AliveTout}$ ($T_{AliveTout}$ is longer than $T_{Alive}$);
(d) identifying a network storm in response to the alive event signal; and
(e) controlling the communication exchanges in response to the alive event signal and current phase of the watchdog thread monitor thread.

23 Claims, 2 Drawing Sheets

PROTECTION OF INDUSTRIAL EQUIPMENT FROM NETWORK STORMS EMANATING FROM A NETWORK SYSTEM

BACKGROUND OF THE INVENTION

Industrial control systems are computer-based systems used to control industrial processes and physical functions, such as computerized manufacturing processes. Today, most industrial control systems are connected to external networks and perform communication exchanges with the external networks through industrial controllers. The communication system of choice has standardized on Ethernet and TCP/IP networks. Over the years, these networks have become very efficient, reliable and sophisticated through the use of managed switches, redundant routers and virtual LANs, but network anomalies still occur. Due to the failure of redundant routers and other network equipment or the presence of computer viruses, network anomalies such as "network storms" may occur.

A network storm is defined as an unusual and extremely high level of network activity in the form of broadcast, multicast and/or unicast message packets that are data meaningless to the computer systems connected to the network. Once a network storm occurs, each computer system connected to the network is forced to receive a large amount of meaningless data. As a result, the computer system becomes stalled and its processing power becomes degraded. Worse, eventually computer system becomes frozen during the network storms. This is more detrimental for the computer system that being used as an industrial control system that controls manufacturing processes.

Thus, a need exists for a method which can monitor the network for the network storms and determine the appropriate response to protect the industrial control systems or more specifically, the industrial controllers, from network storms.

BRIEF SUMMARY OF THE INVENTION

One embodiment of the present invention is a method for protecting a networked industrial controller from network storms, the networked industrial controller has a real-time operating system and communication components performing communication exchanges with connected networks, the method comprising steps of:

(a) Initializing a watchdog thread monitor thread to have a high priority within the real-time operating system's kernel level;

(b) configuring a watchdog thread to periodically (every $T_{Alive}$ time) send an alive event signal to the watchdog thread monitor thread if all other threads of application programs are operating normally;

(c) starting the watchdog thread monitor thread waiting for receiving the alive event signal within a timeout period $T_{AliveTout}$ ($T_{AliveTout}$ is longer than $T_{Alive}$);

(d) identifying a network storm in response to the alive event signal; and (e) controlling the communication exchanges in response to the alive event signal and current phase of the watchdog thread monitor thread.

Another embodiment of the present invention is a computer-readable memory medium comprising program instructions to protect a networked industrial controller from network storms, the networked industrial controller has a real-time operating system and communication components performing communication exchanges with connected networks, wherein the program instructions are executable to:

(a) initialize a watchdog thread monitor thread to have a high priority within the real-time operating system's kernel level;

(b) configuring a watchdog thread to periodically (every $T_{Alive}$ time) send an alive event signal to the watchdog thread monitor thread if all other threads of application programs are operating normally;

(c) start the watchdog thread monitor thread waiting for receiving the alive event signal within a timeout period $T_{AliveTout}$ ($T_{AliveTout}$ is longer than $T_{Alive}$);

(d) identify a network storm in response to the alive event signal; and (e) control the communication exchanges in response to the alive event signal and current phase of the watchdog thread monitor thread.

DETAILED DESCRIPTION OF THE INVENTION

Figure 1:
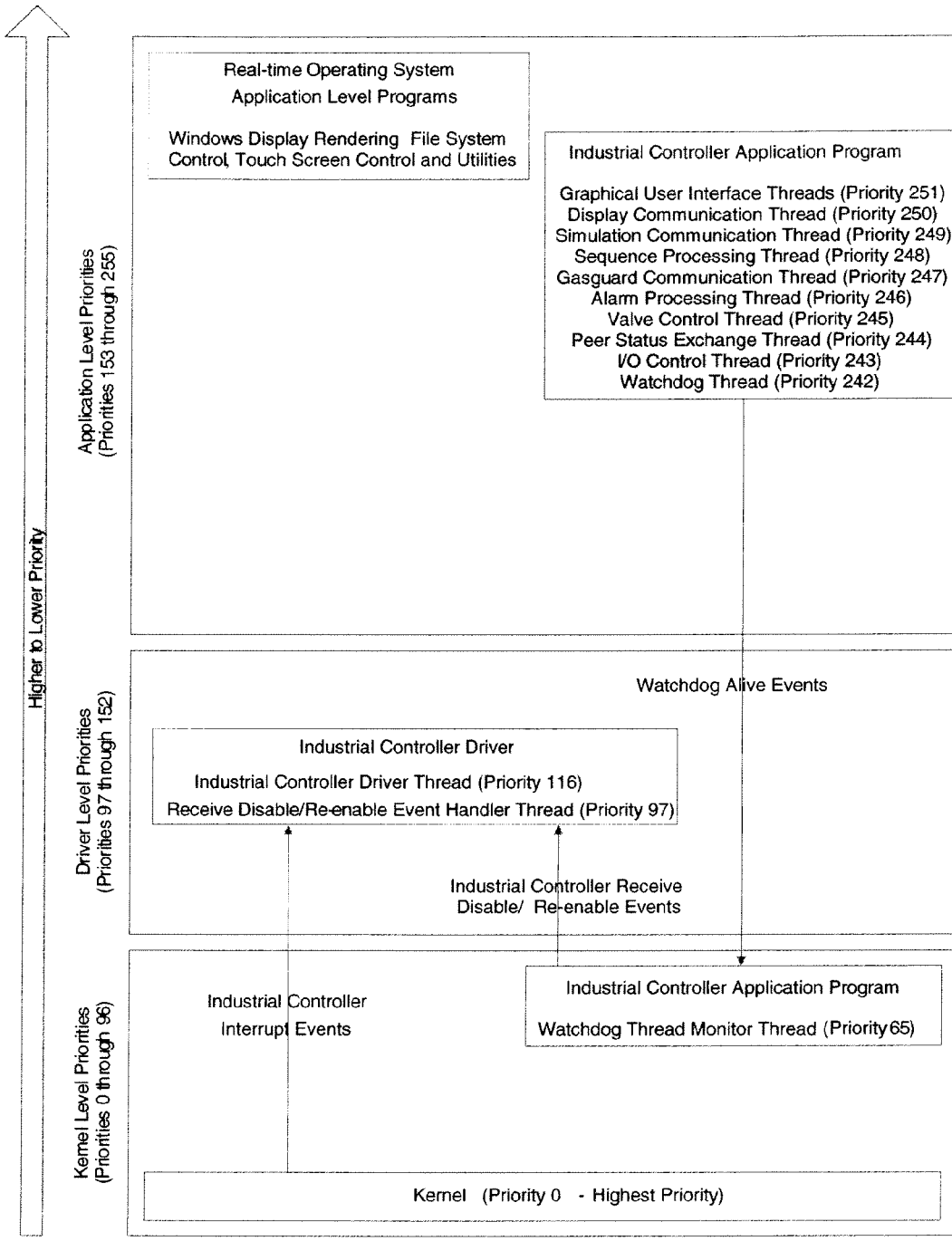
FIG. 1 shows the flow chart of an interrupt handling architecture for a real-time operating system.

Embedded industrial controllers, such as Air Products' AP10/ChemGuard Generation II (AP10/CGGII) Controllers, need to natively communicate to other manufacturing information systems via Ethernet/TCP/IP networks, which mean that those industrial controllers can be exposed to network storms. Industrial controllers respond very rapidly to external events such as changes in analog and digital inputs and receiving communication messages. For industrial controllers, Ethernet communication is interrupt driven, so communication with the controller is extremely fast, but if too many messages are received, the industrial controllers can quickly become overwhelmed and many software functions (threads) cease to execute.

For safety reasons, all control threads within an Industrial Controller Application Program must periodically signal their alive event (normal operating capability) to a watchdog thread, and if all control threads are alive, the watchdog thread signals the hardware that the Industrial Controller Application Program is operating properly. However, in the event of a software malfunction due to one or more of the control threads ceasing to operate properly, resulting in the watchdog thread not signaling the hardware that the controller is fully operational, the hardware will automatically reboot the controller, thereby setting all controller outputs to their safe state. The hardware must be signaled within a certain time period (typically within few seconds to 10 seconds) in order to prevent the controller from rebooting.

When a networked industrial controller is exposed to a network storm, the networked industrial controller becomes overwhelmed handling communication exchange messages. When this happens, the networked industrial control threads cease to signal the watchdog thread, and the watchdog thread ceases to signal the hardware that the controller software is operating normally, and the hardware reboots the networked industrial controller. Clearly, this is the safe response, but definitely is not desirable because all the processes controlled by the networked industrial controller, such as the flow of gases and chemicals, will stop, thereby causing the manufacturing process to shutdown resulting in huge in-process product losses. Hence the need for a networked industrial controller network storm protection of the present invention.

The networked industrial controllers can be protected against network storms, when it is isolated from network storms for limited periods of time. This is achieved by using a real-time operating system, such as Windows CE from Microsoft, and a high priority monitoring thread.

Operation of a Real-Time Operating System

When a computer system has a real-time operating system, the computer responses to system events in a way that is predictable and deterministic with a guaranteed maximum response time that is independent of a system load of simultaneous interrupts and events. Fast operating systems alone are not necessarily real-time operating systems, and their performance is not necessarily predictable or deterministic.

A computer system having a real-time operating system, is multithreaded and preemptive, which means that the execution of lower priority threads will be preempted when higher priority threads become ready to run. This is the proper response of a real-time operating system, but it should be noted that all lower priority threads will never execute if higher priority threads execute continuously. This is the exact response a real-time operating system has to a network storm. In the event of a network storm, the a real-time operating system Kernel will continuously signal the networked industrial controller driver with interrupt events from the networked industrial controller, thereby causing the driver thread to execute continuously and to suspend all lower priority threads.

FIG. 1 shows the flow chart of an interrupt handling architecture for a real-time operating system.

Real-time operating system provides 256 levels of thread priorities where priority 0 is the highest priority and priority 255 is the lowest priority. These thread priorities are grouped into three distinct groups: kernel level priorities, driver level priorities and application level priorities. Though the real-time operating system is much more complex than the diagram illustrates, just the system elements specific to the network storm protection mechanism are detailed for the purpose of describing the present invention.

For real-time performance, the Kernel, which is at the highest priority of 0, processes hardware interrupts very rapidly by just signaling interrupt service threads within the drivers to start executing. This design architecture provides a very predictable and deterministic response to hardware interrupts, and most importantly allows a very high priority thread to preempt the execution of an interrupt service thread. This capability is exploited by the networked industrial controller network storm protection mechanism of the present invention.

As the real-time operating system boots up, the networked industrial controller driver is initialized and configures the Kernel to signal it with events when networked industrial controller interrupts occur. When the networked industrial controller driver receives an interrupt signal from the Kernel, the networked industrial controller driver will execute the interrupt service thread to process the networked industrial controller event.

The Industrial Controller Application Program consists of the Graphical User Interface threads, the watchdog thread and other threads as the control threads (see FIG. 1). The control threads signal the watchdog thread that they're alive (indicating that the control threads are in normal operations), and the watchdog thread signals the hardware that the controller application program is alive.

Operation of the Watchdog Thread Monitor Thread

For the network storm protection, a watchdog thread monitor thread is introduced. The watchdog thread has been configured to periodically signal (every $T_{Alive}$ time period) the watchdog thread monitor thread that the controller application program is alive. As detailed in the subsequent paragraphs, the watchdog thread monitor thread can signal the networked industrial controller driver to disable or re-enable communication exchanges should it detect that the controller application program has stopped executing.

FIG. 1 further shows that when the watchdog thread monitor thread first starts executing, it initializes a number of its control variables and sets its priority within the priorities of the Kernel level, such as to 65. This is important because the watchdog thread monitor thread must be able to preempt the networked industrial controller driver. If the networked industrial controller is exposed to a network storm, the networked industrial controller driver will execute continuously handling the communication exchanges. During this situation, the lower priority threads such as the controller application control threads and watchdog threads will be suspended and will not be able to signal the watchdog thread monitor thread.

Network Storm Protection

Figure 2:
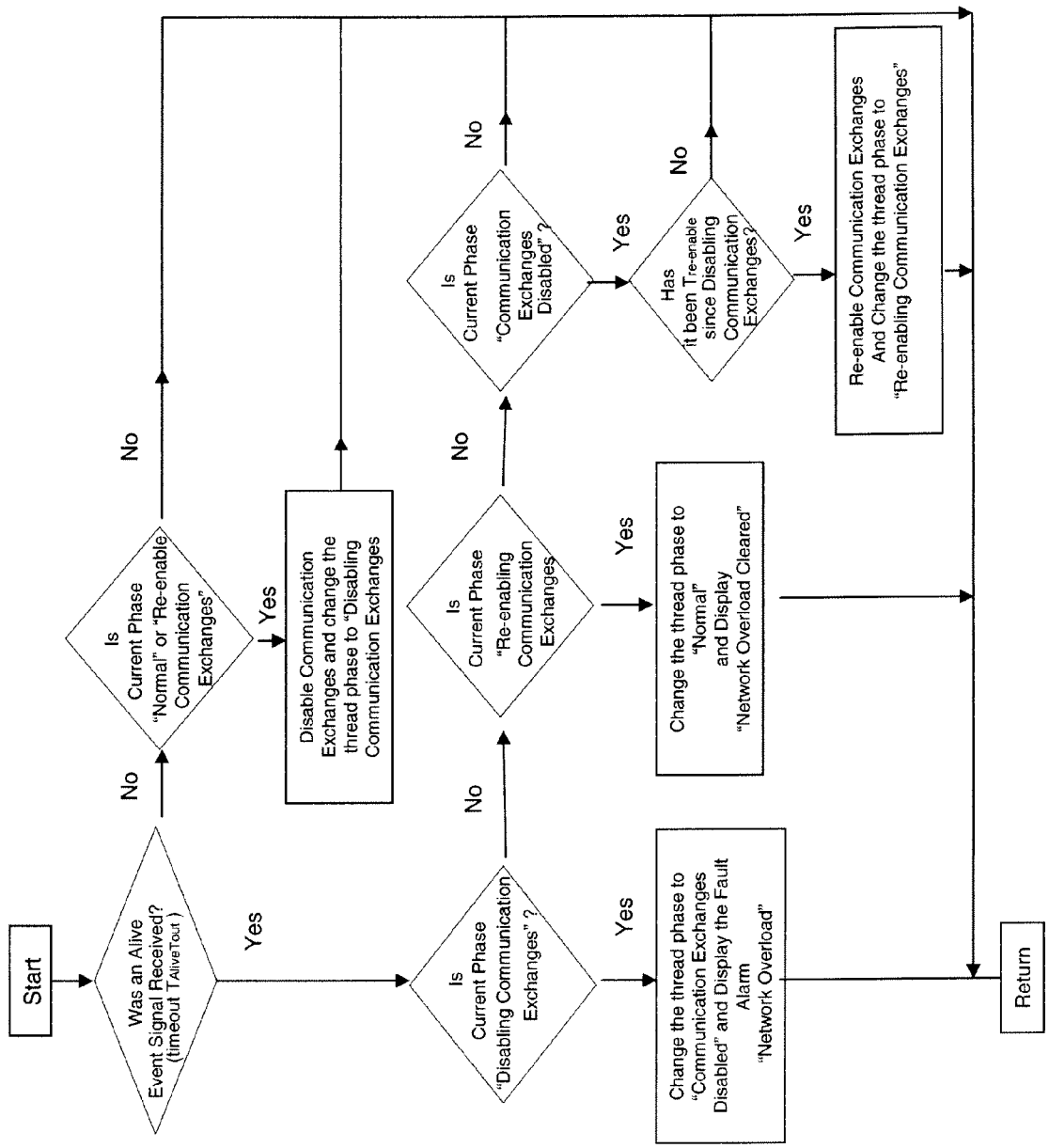
FIG. 2 shows the flow chart of network storm protection method according to the present invention.

FIG. 2 shows the flow chart of network storm protection method according to the present invention. The thread in FIG. 2 refers to the watchdog thread monitor thread.

The networked industrial controller has a real-time operating system and communication components performing communication exchanges with connected networks.

The priority of the watchdog thread monitor thread is initialized within the priorities of the Kernel level (please see FIG. 1) when it first starts executing. The watchdog thread is configured to periodically (every $T_{Alive}$ time) send an alive event signal to the watchdog thread monitor thread if all other threads of application programs are operating normally.

After the initialization, the watchdog thread monitor thread starts waiting for an alive event signal from the watchdog thread, and will timeout within time period $T_{AliveTout}$. $T_{AliveTout}$ is longer than $T_{Alive}$.

As the watchdog thread monitor thread executes, it will be in one of four phases:

(i) Normal; indicating that the networked industrial controller is communicating with the connected networks normally;

(ii) Disabling Communication Exchanges; indicating that the networked industrial controller is in the process of disabling communication exchanges with the connected network;

(iii) Communication Exchanges Disabled; indicating that the communication exchanges from the networked industrial controller have been disabled and no data is exchanged with the connected networks;

(iv) Re-enabling Communication Exchanges; indicating that the networked industrial controller is in the process of enabling communication exchanges with the connected networks.

As detailed in the subsequent paragraphs, the network storm protection method further shows how to identify a network storm in response to the alive event signal; and how to control the communication exchanges in response to the alive event signal and current phase of the watchdog thread monitor thread.

If the watchdog thread monitor thread receives an alive event signal from the watchdog thread, which generally happens every $T_{Alive}$ time period, then it will check if the controller is alive as a result of disabling communication exchanges. If the current watchdog thread monitor thread phase is "Disabling Communication Exchanges", then the watchdog thread monitor thread phase will be changed to "Communication Exchanges Disabled" and a "Network Overload" fault alarm will be displayed on the graphical user interface of the controller. The watchdog thread monitor thread then returns back to the "Start".

If the watchdog thread monitor thread receives an alive event signal from the watchdog thread and the current watchdog thread monitor thread phase is not "Disabling Communication Exchanges", the next check the watchdog thread monitor thread will perform is to check if the networked industrial controller is still alive after re-enabling communication exchanges. The following steps will be performed:

(1) If the current thread phase is "Re-enabling Communication Exchanges", then the watchdog thread monitor thread phase will be changed to "Normal" and a "Network Overload Cleared" message will be displayed on the graphical user interface of the controller. The watchdog thread monitor thread then returns back to the "Start";

(2) If the current thread phase is not "Re-enabling Communication Exchanges", the next check the watchdog thread monitor thread will perform is to check if its time to re-enable Communication exchanges:

(2a) If the current thread phase is "Communication Exchanges Disabled", then the watchdog thread monitor thread will determine whether certain time period $T_{Re-enable}$ ($T_{Re-enable}$ > $T_{AliveTout}$) has elapsed since Communication exchanges have been disabled;

(2a-1) if $T_{Re-enable}$ has elapsed since Communication exchanges has been disabled, then communication exchanges will be re-enabled and the thread phase will be changed to "Re-enabling Communication Exchanges"; the watchdog thread monitor thread then returns back to the "Start";

(2a-2) if $T_{Re-enable}$ has not elapsed since communication exchanges had been disabled, the watchdog thread monitor thread then returns back to the "Start";

(2b) If the current thread phase is not "Communication Exchanges Disabled", the watchdog thread monitor thread returns back to the "Start".

If the watchdog thread monitor thread doesn't receive an alive event signal within the wait timeout period $T_{AliveTout}$, then it's concluded that the networked industrial controller has stopped executing. If the current thread phase is "Normal" or "Re-enabling Communication Exchanges", then communication exchanges will be disabled and the thread phase will be changed to "Disabling Communication Exchanges". The watchdog thread monitor thread then returns back to the "Start". If the current thread phase is not "Normal" or "Re-enabling Communication Exchanges", then the watchdog thread monitor thread returns back to the "Start".

The typically range of $T_{Alive}$ is from 200 milliseconds to 1 second, preferably 500 milliseconds. $T_{AliveTout}$ is longer than $T_{Alive}$. The typically range of $T_{AliveTout}$ is from 1 seconds to 30 seconds, preferably 1.2 seconds. $T_{Re-enable}$ is longer than $T_{AliveTout}$. The typically range of $T_{Re-enable}$ is equal and greater than 2 seconds, preferably 20 seconds.

This cycle of waiting for alive event signals and checks based on the current thread phase will continue indefinitely.

The embodiments of this invention listed above, are exemplary of numerous embodiments that may be made of this invention. It is contemplated that numerous other configurations of the method other than those specifically disclosed may be used.

The invention claimed is:

1. A method for protecting a networked industrial controller from network storms, the networked industrial controller has a real-time operating system and communication components performing communication exchanges with connected networks, the method comprising steps of:

(a) Initializing a watchdog thread monitor thread within the real-time operating system's kernel to have the watchdog thread monitor thread a kernel level priority;

(b) configuring a watchdog thread to periodically (every $T_{Alive}$ time) send an alive event signal to the watchdog thread monitor thread if all other threads of application programs are operating normally;

(c) starting the watchdog thread monitor thread waiting for receiving the alive event signal within a timeout period $T_{AliveTout}$ ($T_{AliveTout}$ is longer than $T_{Alive}$);

(d) identifying a network storm in response to the alive event signal; and (e) controlling the communication exchanges in response to the alive event signal and current phase of the watchdog thread monitor thread;

wherein the watchdog thread monitor thread has four different phases:

(i) Normal; indicating that the networked industrial controller is communicating with the connected networks normally;

(ii) Disabling Communication Exchanges; indicating that the networked industrial controller is in the process of disabling communication exchanges with the connected network;

(iii) Communication Exchanges Disabled; indicating that the communication exchanges from the networked industrial controller have been disabled and no data is exchanged with the connected networks;

(iv) Re-enabling Communication Exchanges; indicating that the networked industrial controller is in the process of enabling communication exchanges with the connected networks.

2. The method of claim 1, wherein the steps (d) and (e) for identifying a network storm and controlling the communication exchanges further comprising:

(d1) if no alive event signal is received during the timeout period $T_{AliveTout}$ and the current watchdog thread monitor thread phase is either "Normal" or "Re-enabling Communication Exchanges", then (e1) disabling the communication exchanges and changing the watchdog thread monitor thread phase to "Disabling Communication Exchanges"; and (e2) returning to step (c).

3. The method of claim 1, wherein the steps (d) and (e) for identifying a network storm and controlling the communication exchanges further comprising:

(d1) if no alive event signal is received during the timeout period $T_{AliveTout}$ and the current watchdog thread monitor thread phase is neither "Normal" nor "Re-enabling Communication Exchanges", then (e1) returning to step (c).

4. The method of claim 1, wherein the steps (d) and (e) for identifying a network storm and controlling communication exchanges further comprising:

(d1) if the alive event signal is received during the timeout period $T_{AliveTout}$ and the current watchdog thread monitor thread phase is "Disabling Communication Exchanges", then (e1) changing the watchdog thread monitor thread phase to "Communication Exchanges Disabled" and displaying "Network Overload"; and (e2) returning to step (c).

5. The method of claim 1, wherein the steps (d) and (e) for identifying a network storm and controlling the communication exchanges further comprising:
- (d1) if the alive event signal is received during the timeout period $T_{AliveTout}$ and the current watchdog thread monitor thread phase is "Communication Exchanges Disabled" and the communication exchanges have been disabled for a period of time $T_{Re-enable}$ ($T_{Re-enable}$ is longer than $T_{AliveTout}$), then
- (e1) re-enabling the communication exchanges and changing the watchdog thread monitor thread phase to "Re-enabling Communication Exchanges"; and
- (e2) returning to step (c).

6. The method of claim 1, wherein the steps (d) and (e) for identifying a network storm and controlling the communication exchanges further comprising:
- (d1) if the alive event signal is received during the timeout period $T_{AliveTout}$ and the current watchdog thread monitor thread phase is "Communication Exchanges Disabled" and the communication exchanges have not been disabled for a period of time $T_{Re-enable}$ ($T_{Re-enable}$ is longer than $T_{AliveTout}$), then
- (e1) returning to step (c).

7. The method of claim 1, wherein the steps (d) and (e) for identifying a network storm and controlling the communication exchanges further comprising:
- (d1) if the alive event signal is received during the timeout period $T_{AliveTout}$ and the current watchdog thread monitor thread phase is "Re-enabling Communication Exchanges", then
- (e1) changing the watchdog thread monitor thread phase to "Normal" and displaying "Network Overload Cleared"; and
- (e2) returning to step (c).

8. The method of claim 1, further comprising step (f) repeating steps (c), (d) and (e).

9. The method of claim 1, wherein the networked industrial controller is using Windows CE as an operating system, the connected networks are using TCP/IP as communication protocol and communication exchanges are Ethernet communication exchanges.

10. The method of claim 5 wherein $T_{Alive}$ is in the range of 200 milliseconds to 1 second.

11. The method of claim 5 wherein $T_{Alive}$ is 500 milliseconds.

12. The method of claim 1 wherein $T_{AliveTout}$ is longer than $T_{Alive}$ and is in the range of 1 second to 30 seconds.

13. The method of claim 1 wherein $T_{AliveTout}$ is 1.2 seconds.

14. The method of claim 1 wherein $T_{Re-enable}$ is longer than $T_{AliveTout}$ and is equal and greater than 2 seconds.

15. The method of claim 1 wherein $T_{Re-enable}$ is 20 seconds.

16. A computer-readable memory medium comprising program instructions to protect a networked industrial controller from network storms, the networked industrial controller has a real-time operating system and communication components performing communication exchanges with connected networks, wherein the program instructions are executable to:
- (a) Initializing a watchdog thread monitor thread within the real-time operating system's kernel to have the watchdog thread monitor thread a kernel level priority;
- (b) configuring a watchdog thread to periodically (every $T_{Alive}$ time) send an alive event signal to the watchdog thread monitor thread if all other threads of application programs are operating normally;
- (c) start the watchdog thread monitor thread waiting for receiving the alive event signal within a timeout period $T_{AliveTout}$ ($T_{AliveTout}$ is longer than $T_{Alive}$);
- (d) identify a network storm in response to the alive event signal; and
- (e) control the communication exchanges in response to the alive event signal and current phase of the watchdog thread monitor thread;

wherein the watchdog thread monitor thread has four different phases:
- (i) Normal; indicating that the networked industrial controller is communicating with the connected networks normally;
- (ii) Disabling Communication Exchanges; indicating that the networked industrial controller is in the process of disabling communication exchanges with the connected network;
- (iii) Communication Exchanges Disabled; indicating that the communication exchanges from the networked industrial controller have been disabled and no data is exchanged with the connected network;
- (iv) Re-enabling Communication Exchanges; indicating that the networked industrial controller is in the process of enabling communication exchanges with the connected network.

17. The memory medium of claim 16, wherein the steps (d) and (e) for identifying a network storm and controlling the communication exchanges further comprising:
- (d1) if no alive event signal is received during the timeout period $T_{AliveTout}$ and the current watchdog thread monitor thread phase is either "Normal" or "Re-enabling Communication Exchanges", then
- (e1) disabling the communication exchanges and changing the watchdog thread monitor thread phase to "Disabling Communication Exchanges"; and
- (e2) returning to step (c).

18. The memory medium of claim 16, wherein the steps (d) and (e) for identifying a network storm and controlling the communication exchanges further comprising:
- (d1) if no alive event signal is received during the timeout period $T_{AliveTout}$ and the current watchdog thread monitor thread phase is neither "Normal" nor "Re-enabling Receives", then
- (e1) returning to step (c).

19. The memory medium of claim 16, wherein the steps (d) and (e) for identifying a network storm and controlling the communication exchanges further comprising:
- (d1) if the alive event signal is received during the timeout period $T_{AliveTout}$ and the current watchdog thread monitor thread phase is "Disabling Communication Exchanges", then a network storm is identified;
- (e1) changing the watchdog thread monitor thread phase to "Communication Exchanges Disabled" and displaying "Network Overload"; and
- (e2) returning to step (c).

20. The memory medium of claim 16, wherein the steps (d) and (e) for identifying a network storm and controlling the communication exchanges further comprising:
- (d1) if the alive event signal is received during the timeout period $T_{AliveTout}$ and the current watchdog thread monitor thread phase is "Communication Exchanges Disabled" and the communication exchanges has been disabled for a period of time $T_{Re-enable}$ ($T_{Re-enable}$ is longer than $T_{AliveTout}$), then
- (e1) re-enabling the communication exchanges and changing the watchdog thread monitor thread phase to "Re-enabling Communication Exchanges" and
- (e2) returning to step (c).

21. The memory medium of claim 16, wherein the steps (d) and (e) for identifying a network storm and controlling the communication exchanges further comprising:

(d1) if the alive event signal is received during the timeout period $T_{AliveTout}$ and the current watchdog thread monitor thread phase is "Communication Exchanges Disabled" and the communication exchanges have not been disabled for a period of time $T_{Re\text{-}enable}$ ($T_{Re\text{-}enable}$ is longer than $T_{AliveTout}$), then (e1) returning to step (c).

22. The memory medium of claim 16, wherein the steps (d) and (e) for identifying a network storm and controlling the communication exchanges further comprising:

(d1) if the alive event signal is received during the timeout period $T_{AliveTout}$ and the current watchdog thread monitor thread phase is "Re-enabling Communication Exchanges", then (e1) changing the watchdog thread monitor thread phase to "Normal" and displaying "Network Overload Cleared"; and (e2) returning to step (c).

23. The memory medium of claim 16 further comprising step (f) repeating steps (c), (d) and (e).

* * * * *